Nov. 17, 1942.    H. V. GILL    2,302,116
OIL FILTER
Filed April 20, 1940    2 Sheets—Sheet 1
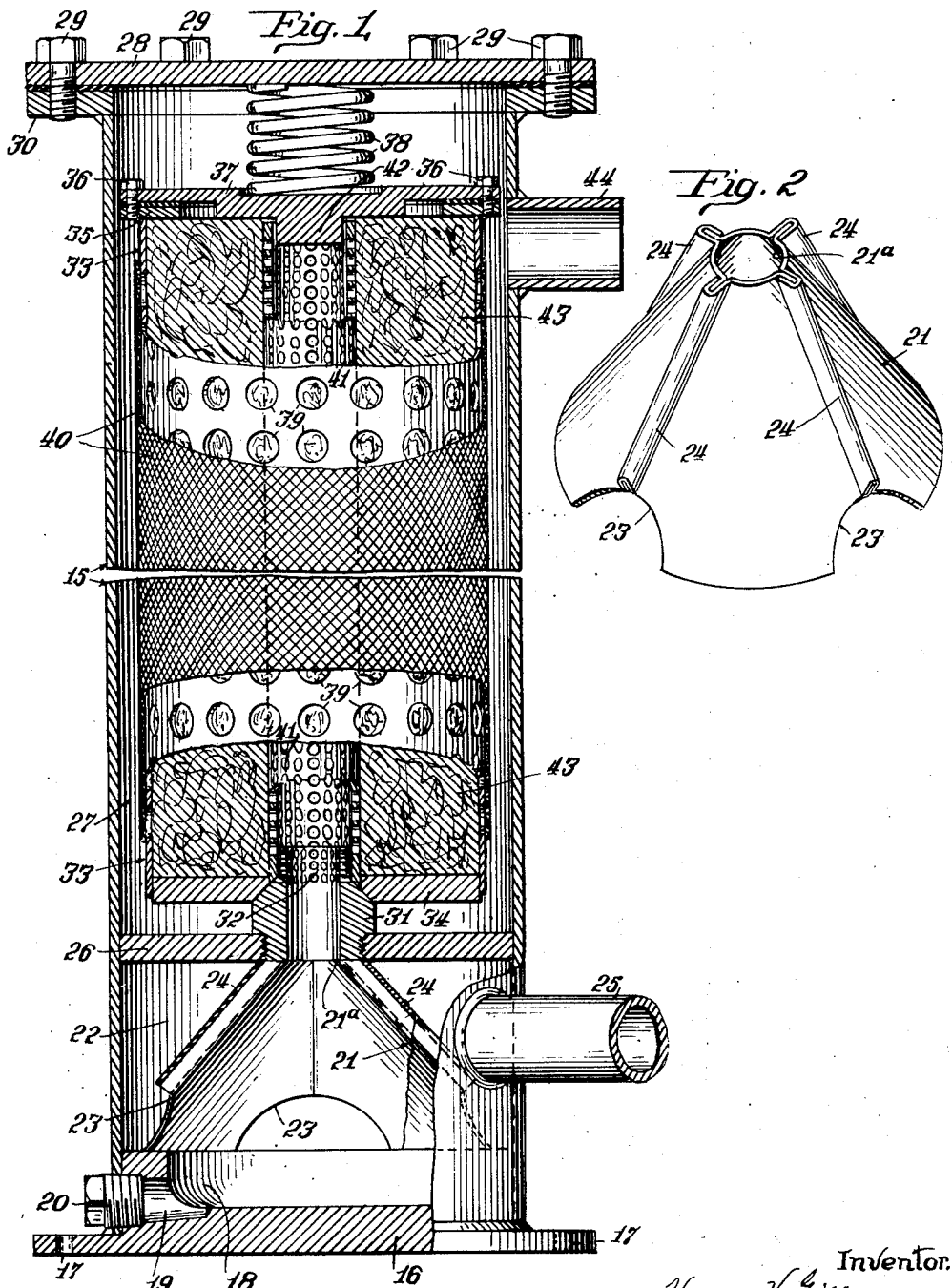
Inventor.
Harry V. Gill,
By George Heideman
Attorney.

Nov. 17, 1942.  H. V. GILL  2,302,116
OIL FILTER
Filed April 20, 1940   2 Sheets-Sheet 2
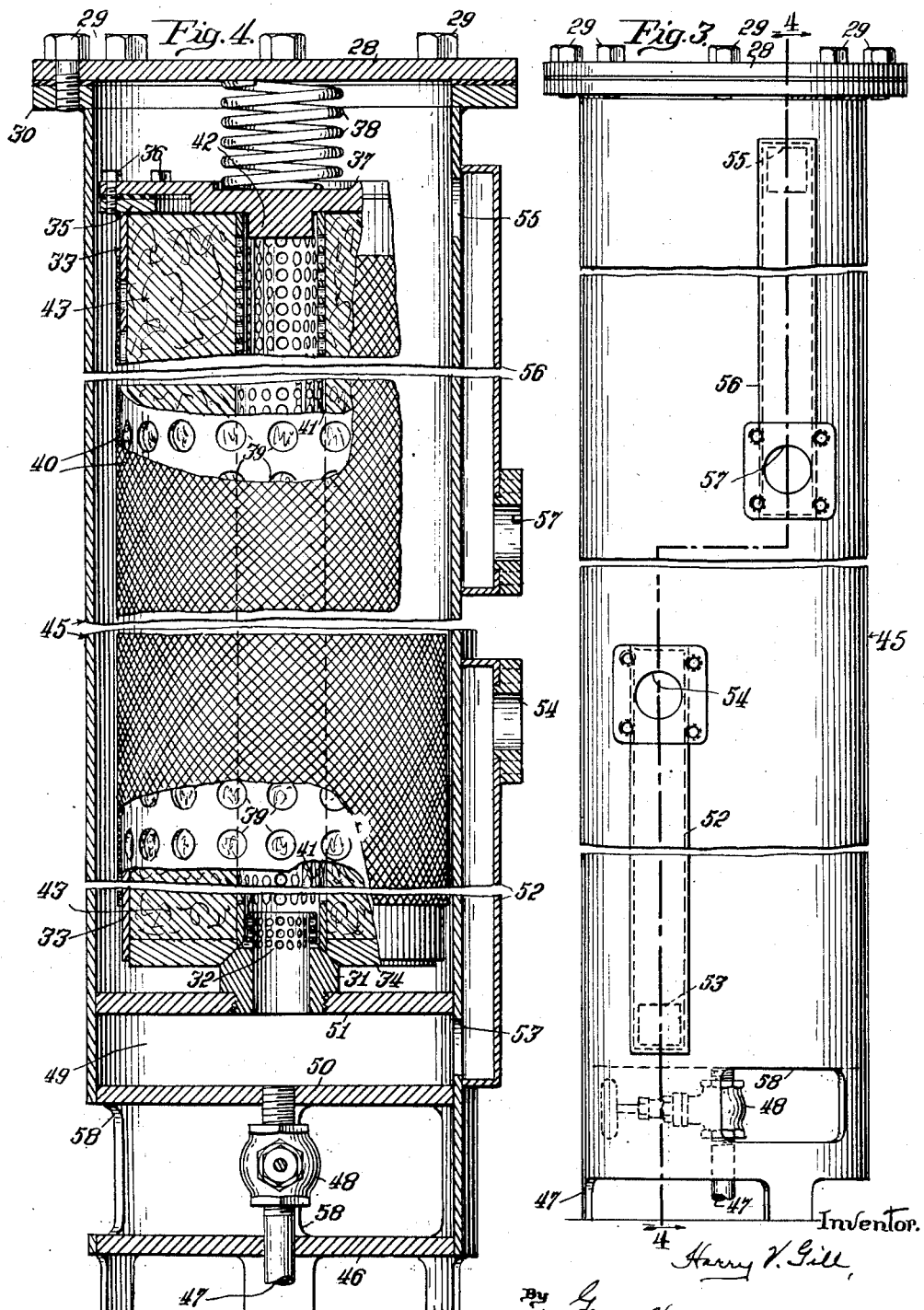

Patented Nov. 17, 1942

2,302,116

UNITED STATES PATENT OFFICE 2,302,116

OIL FILTER

Harry V. Gill, La Grange, Ill.

Application April 20, 1940, Serial No. 330,716

5 Claims. (Cl. 210—131)

My invention relates to filters more especially intended for filtering the lubricating oil of Diesel engines, being particularly adapted to the present location and arrangement of piping, etc., as employed in present day Diesel locomotives and has for one of its objects the provision of a filter which is simple in operation and rugged in construction.

The invention also has for its object the provision of a device whereby any heavy particles contained in the oil will be separated therefrom and the oil made to pass lengthwisely through a filtering medium containing element which may be readily removed and easily cleaned or replenished without disconnecting the body of the filter from the oil line of the locomotive.

A further object of the invention consists in providing a filter which will ensure proper flow of lubricating oil to the cylinders of the engine in the event the filtering medium or filtering medium containing element become filled or clogged with impurities; namely a filter which may be applied directly in the line carrying fuel oil flowing either from or to the oil pumps.

The objects and advantages of my invention will all be fully comprehended from the following detailed description of the accompanying drawings wherein:

Figure 1 is a vertical sectional elevation of one form of my invention with an intermediate portion broken away.

Figure 2 is a detail perspective view of a velocity reducing and separating element employed in the inflowing oil receiving chamber of the device.

Figure 3 is a side elevation of a modified form of the invention.

Figure 4 is a vertical sectional view taken substantially on the line 4—4 of Figure 3, with portions in elevation.

My improved filter, although permitting more general adaptations, is especially intended for use with present day arrangement and type of Diesel engines and in the particular exemplification shown in Figures 1 and 2 consists of a main shell or outer cylindrical casing 15 provided with an integrally united bottom 16 which is flanged or preferably of diameter somewhat greater than the diameter of the casing 15 and the flange or bottom extension provided with bolt receiving holes as at 17. The bottom 16, which preferably extends into the casing 15, is shown dished or hollowed out on its upper surface as shown at 18 and is provided with a drain opening 19 leading from the well 18 to the casing exterior and provided with a suitable closure plug 20. The hollowed out portion or well 18 does not extend entirely to the casing wall in order that the perimetrical portion of the bottom 16 may act as a support for the truncated cone shaped hollow element 21 arranged in the separator chamber 22 of the casing 15. The element 21 at its bottom is cut out to provide the comparatively large openings as shown at 23—preferably four in number equally spaced about the annular lower edge of the element—to permit free flow of the oil beneath the element and into the well 18.

The outer side of element 21 is shown provided with a number of radial ribs 24 preferably extending from each cut-out or opening 23 to the upper end of the element, see Figure 2. These ribs 24 tend to break up the velocity or centrifugal flow of the oil introduced into chamber 22 by the tube or pipe 25 connected to a suitable opening in the side of the main casing 15, and preferably arranged at a slight tangent, so as to discharge intermediate of the upper and lower ends of member 21.

The separator chamber 22 is arranged intermediate of the bottom 16 and the diaphragm 26 which constitutes the bottom of the filter holding chamber 27 provided at top with a cover 28 which is removably secured in place by suitable bolts 29 which screw into tapped holes in the flange 30 secured to the upper end of the main shell or casing 15.

The diaphragm 26 is centrally provided with a threaded hole to receive the externally threaded portion of a thimble member 31 having an outer beveled surface and provided at its top with an upwardly extending perforated tubular portion 32. The lower orifice of the thimble member 31 is aligned with the opening 21ᵃ in the top of the hollow member 21, so that oil entering chamber 22 through pipe 25 and passing into member 22 through openings 23 will pass upwardly through the thimble member 31 and pass into the filter cartridge now to be described.

The filter cartridge consists of a cylindrical shell 33 of diameter smaller than the diameter of the chamber 27 in the main shell 15 so as to provide a clearance or annular passage about the cartridge. The cartridge shell 33 is provided with a bottom 34 having a central beveled opening to receive the beveled surface of thimble member 31 and allow the perforated tubular portion 32 of the thimble member 31 to extend upwardly into the cartridge and effect communication between the separator chamber 22 and the interior of the cartridge.

The upper end of the cartridge shell 33 is provided with a flange or flat ring 35 provided with a suitable number of tapped holes to receive bolts 36 whereby the top closure member 37 is removably secured in place. The upper surface of the closure member 37 is shown with an annular depression to provide a seat for the lower end of an expansion spring 38 whose upper end is in pressure exerting engagement with the main cover 28. Spring 38 is adapted to exert a predetermined amount of pressure on the cartridge and normally maintain it in seating relation with the beveled surface of thimble member 31, while allowing upward movement of the cartridge when pressure within the cartridge exceeds the predetermined pressure of spring 38.

The cartridge shell 33 is provided with a plurality of holes 39 and the perforated portion of the shell is preferably covered with two layers of fine mesh wire screen as at 40.

The cartridge is centrally provided with a perforated tube 41 extending from the bottom 34 to the top 37 which is provided with a depending hub portion 42 which extends into the tube 41 to maintain the latter in place.

The cartridge shell 33 is provided with a waste material or suitable filtering medium as indicated at 43 which is packed around the perforated tube 41; the tube 41, filtering medium 43, shell 33 and fine mesh wire 40 constituting a main filtering unit or cartridge which may be readily removed from the outer casing 15 when occasion requires.

The outer casing 15 at its upper end, substantially in alignment with the upper end of the cartridge shell 33, is provided with an oil outlet 44.

In operation, the oil enters the filter through inlet pipe 25,—preferably arranged tangentially to the diameter of the separator chamber 22,—and the velocity of the oil broken up by the cone-shape separator element 21 which induces separation of heavier particles and allows the latter to settle into the well 18, while the accumulating oil flows upwardly through element 21, thimble 31 and is conveyed into the lower end of perforated tube 41. The oil passes through the perforations of tube 41, percolates through the filtering medium 43 and passes through the perforations of shell 33 and the fine mesh wire 40 (which prevents particles of waste material passing out of the cartridge with the oil) into the chamber 27 of the main casing, from whence it is conveyed to the point of use by the discharge pipe 44.

In the event the filter cartridge becomes clogged, the pressure of the rising oil in the inner tube 41, when it exceeds the pressure of spring 38, will induce the cartridge to move upwardly off its seat on thimble member 31 sufficiently to uncover the perforations in the upper end of the thimble, allowing the oil to flow directly into the chamber 27 of the main casing, to be discharged by pipe 44, thus ensuring a constant flow of oil to the engine.

In Figures 3 and 4 I show a modification of my improved oil filter, namely a filter differing in certain respects from the construction heretofore described and which is more especially adapted to a multiple cylinder type of Diesel engine, its location and piping arrangement employed in certain Diesel locomotives as at present employed.

The embodiment shown in Figures 3 and 4 consists of a cylindrical outer shell or casing 45 having a bottom 46 with an opening for passage of drain pipe 47 therethrough; drain pipe 47 being provided with a suitable valve 48 which has communication with the oil receiving chamber 49 arranged in the lower end of the cylindrical shell 45 by the diaphragms 50 and 51.

The shell 45, the same as shell 15 of the previously described construction, is of preselected size to provide sufficient filtering capacity; the oil to be filtered being introduced into chamber 49 by means of a vertically disposed channel 52 secured on the outer side of shell 45; the lower end of the channel communicating with chamber 49 by the opening 53; while the upper end of the channel has an opening 54 which connects with the oil supply or pump.

The diaphragm 51 has a central tapped opening to receive the thimble member 31 similar to the one shown in Figure 1 having a tapered outer surface and an upstanding perforated tubular portion 32.

The main shell or casing 45 is also provided with a filter cartridge similar to that in Figure 1 and consisting of the cylindrical shell 33 of diameter smaller than the inside diameter of the outer shell to provide an annular passage or chamber about the cartridge. The shell 33 has a bottom 34 provided with a tapered opening and seats on the tapered portion of thimble 31, while the tubular extension 32 of the thimble member extends above the bottom 34. The shell has a plurality of holes 39 and the shell has the fine mesh wire screen 40 secured thereabout throughout its perforated portion; the top of the shell 33 being provided with a cover 37 removably secured thereto and provided with the annular boss 42 which receives the upper end of the perforated tube 41 whose lower end fits about the tubular extension 32 of the thimble member 31. The shell 33 is also provided with a waste material or suitable filtering medium 43 packed around the tube 41.

The upper end of outer casing 45 is provided with a suitable coil spring 38, between the top of the cartridge and the removable cover 28 of the outer casing 45, adapted to exert a predetermined amount of pressure on the cartridge top or cover 37 to normally maintain the cartridge on its seat on thimble 31 and hence below the perforated portion of the tubular extension 32 of the member 31.

The outer shell or casing 45 adjacent its upper end and beneath the top of the cartridge is provided with an opening 55 which communicates with the conduit or channel 56 secured lengthwisely to the outside of casing 45 and provided at its lower end with an outlet 57 to receive a pipe connection leading to the Diesel engine.

The lower end of the outer casing 45 is shown provided with cut-out portions or openings at 58 to provide access to the valve 48.

Should the cartridge become clogged against free passage of oil therethrough, the incoming oil will build up a pressure in the tube 41 until the pressure exceeds that of the spring 38, causing the cartridge to be forced upwardly off its seat and allow the oil to discharge through the perforations in the extension 32 of the thimble member 31 and pass around the member 31 and into the chamber of outer casing 45 and rise about the cartridge until it reaches the outlet opening 55 and discharges into the conduit 56 from whence it is taken to the engine.

The exemplifications are believed to be the best embodiments of the invention which has been described in terms employed for purposes of description but not as terms of limitation, as modifications may be made without, however, departing from the spirit of my invention as defined in the appended claims.

What I claim is:

1. An oil filter of the character described comprising an outer casing with a removable cover, an oil receiving chamber in its bottom and a filter unit holding chamber between the cover and the receiving chamber and having an outlet in its side; an oil conveying thimble arranged in the upper wall of the oil receiving chamber and disposed upwardly into the filter unit holding chamber; a velocity reducing hollow cone-shaped member in the oil receiving chamber provided with velocity reducing surfaces on its outer side, oil passages at its lower end and with an opening in its top arranged in communication with the lower end of said thimble; a filter unit seated on said thimble in spaced relation with the walls of said casing and involving a perforated shell covered with a wire screen, a perforated tube arranged centrally in the shell with its lower end in communication with the upper end of said thimble, a filtering medium arranged in the shell about said tube and a removable cover for said shell and for said tube; and a pressure spring between the casing cover and top of the filter unit whereby the latter is yieldingly held to its seat on said thimble.

2. An oil filter comprising an outer casing having a bottom, removable cover and an apertured diaphragm above the bottom to provide an oil receiving and separating chamber in the lower end and a filter holding chamber thereabove; an oil inlet in the side wall of the separating chamber; means whereby the velocity of the incoming oil is reduced; an outlet in the side wall adjacent the upper end of the filter holding chamber; a closed ended filtering cartridge arranged in spaced relation with the outer casing, provided with a beveled orifice in its bottom and an inner perforated tube surrounding said orifice and closed at its upper end; a thimble member arranged in the aperture of said diaphragm, provided with a tapered outer surface adapted to enter the beveled orifice in the bottom of the cartridge to support the latter in place and having a perforated tubular extension which enters the lower end of said inner tube; and means whereby the cartridge is yieldingly held on said thimble.

3. An oil filter of the character described, comprising an outer casing with a removable top, an apertured diaphragm in its lower end above the bottom to provide an oil receiving and settling chamber beneath said diaphragm and a filter unit holding chamber thereabove, the upper end of the last mentioned chamber having an outlet in its side wall while the first mentioned chamber has an inlet in its side wall; means whereby the velocity of the incoming oil is reduced; a filter unit arranged in spaced relation with the walls of the second mentioned chamber, consisting of a perforated outer shell with fine mesh wire screen arranged on its inner surface and having a removable cover and a bottom with a central opening, a perforated tube about said opening extending centrally within the shell and its upper end closed by the shell cover and a filter medium arranged intermediate of the wire screen and the inner tube; an oil conveying thimble arranged in the aperture of said diaphragm with a perforated tubular extension at its top adapted to extend a predetermined distance into the inner tube, said thimble establishing communication between the oil receiving and settling chamber and the core of the filter unit and being adapted to support the filter unit above the diaphragm; and a spring between the casing cover and the cover of the filter unit for yieldingly holding said unit on said thimble whereby the oil may be by-passed around the unit when resistance to the flow of oil through the unit reaches a predetermined degree.

4. In an oil filter for Diesel engines, an outer casing with a removable top and an apertured diaphragm above its bottom to provide an oil receiving and settling chamber beneath the diaphragm and a filter holding chamber above the diaphragm, the side wall of the first chamber having an inlet opening while the side wall of the second chamber has an outlet opening; a filter unit arranged in the second chamber in spaced relation with its sides and having a perforated central tube; an oil conveying thimble extending through the aperture in the diaphragm adapted to support the filter unit in spaced relation with the diaphragm and having a perforated upwardly disposed tubular extension adapted to enter the lower end of the perforated tube of the filter unit; oil velocity reducing means in said first mentioned chamber through which the incoming oil is made to flow, the upper end of said means being adapted to convey the oil through said thimble; and a pressure spring intermediate the casing top and said filter unit whereby the latter is yieldingly held on said thimble, said spring being adapted to permit the filter unit to move upwardly sufficiently to uncover the perforations in the tubular extension of the thimble to permit oil to flow about the filter unit.

5. In an oil filter for Diesel engines, the combination of a self-supporting vertically disposed outer casing with a closed bottom and a removable top, the casing having a centrally apertured diaphragm whereby the casing is provided with an oil receiving and settling chamber in its bottom having an oil inlet and with a filter unit holding chamber in the upper end provided with an oil discharge in its side wall; a cylindrical closed ended vertically disposed filter unit removably arranged in the second chamber in spaced relation with the walls thereof and composed of a perforated shell with wire mesh secured thereabout, with a centrally apertured bottom and a removable top provided with a central boss on its lower face, a perforated open-ended tube disposed centrally throughout the shell with its open lower end disposed about the aperture in the shell bottom while the upper end of the tube receives said boss and is closed thereby and a filtering medium arranged in the shell about said tube; a nipple member arranged in the aperture of said diaphragm and extending into the aperture in the bottom of the filter shell and into the lower end of said tube whereby communication between the first mentioned chamber and the lower end of the filter unit tube is established, said nipple member being adapted to support the filter unit in spaced relation with said diaphragm; and a pressure spring intermediate the casing top and the filter shell top whereby the boss of the latter is held in sealing relation with the upper end of said tube and the filter unit yieldingly held on said nipple member.

HARRY V. GILL.